(12) United States Patent
Thomas et al.

(10) Patent No.: US 10,802,172 B2
(45) Date of Patent: Oct. 13, 2020

(54) METHOD AND SYSTEM FOR DETECTING A SPECIFIC RELATIVE POSITION BETWEEN TWO OBJECTS

(71) Applicant: COMMISSARIAT A L'ENERGIE ATOMIQUE ET AUX ENERGIES ALTERNATIVES, Paris (FR)

(72) Inventors: Thierry Thomas, Varces Allieres et Risset (FR); Jacques Reverdy, Crolles (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 87 days.

(21) Appl. No.: 16/321,482

(22) PCT Filed: Jul. 27, 2017

(86) PCT No.: PCT/FR2017/052107
§ 371 (c)(1),
(2) Date: Jan. 29, 2019

(87) PCT Pub. No.: WO2018/024967
PCT Pub. Date: Feb. 8, 2018

(65) Prior Publication Data
US 2020/0249372 A1 Aug. 6, 2020

(30) Foreign Application Priority Data

Aug. 1, 2016 (FR) ..................................... 16 57482

(51) Int. Cl.
*G01V 3/10* (2006.01)
*H04B 5/02* (2006.01)
*H04B 5/00* (2006.01)

(52) U.S. Cl.
CPC .............. *G01V 3/10* (2013.01); *H04B 5/0062* (2013.01); *H04B 5/0075* (2013.01); *H04B 5/02* (2013.01)

(58) Field of Classification Search
CPC ...... G01V 3/10; H04B 5/0062; H04B 5/0075; H04B 5/02; G06K 19/07; G01S 13/08; G08B 13/14; G01R 31/11; G01R 31/085
(Continued)

(56) References Cited

U.S. PATENT DOCUMENTS

| 5,929,760 A | 7/1999 | Monahan | |
| 2007/0290846 A1* | 12/2007 | Schilling | G06K 7/10128 340/572.1 |
| 2010/0282849 A1* | 11/2010 | Mair | G06K 7/10128 235/439 |

FOREIGN PATENT DOCUMENTS

| EP | 1 043 679 A1 | 10/2000 |
| EP | 2 077 518 A1 | 7/2009 |

(Continued)

OTHER PUBLICATIONS

International Search Report dated Nov. 22, 2017 in PCT/FR2017/052107 filed on Jul. 27, 2017.
(Continued)

*Primary Examiner* — Melissa J Koval
*Assistant Examiner* — Trung Nguyen
(74) *Attorney, Agent, or Firm* — Oblon, McClelland, Maier & Neustadt, L.L.P.

(57) ABSTRACT

A system for detecting a specific relative position between a reader and a receiver, including: an inductive contactless receiver including an antenna winding and a circuit for selectively modulating a load; an inductive contactless reader including: a transceiver antenna circuit having non-zero mutual inductance with the antenna winding for the position, a communication circuit connected to the trans-
(Continued)

ceiver antenna circuit, a receiver antenna circuit having mutual inductance with the antenna winding that exhibits a minimum for the position, and a processing circuit for: identifying presence of a receiver by detecting nonzero mutual inductance between the transceiver antenna circuit and an antenna winding, and detecting a mutual inductance minimum between the receiver antenna circuit and an antenna winding.

12 Claims, 6 Drawing Sheets

(58) Field of Classification Search
USPC ...... 324/200, 207.11–207.23, 300, 313, 500, 324/501, 508, 510, 754.31, 764.01, 314, 324/329, 600, 637, 639, 76.11, 76.14, 324/76.35, 76.36, 76.54
See application file for complete search history.

(56) References Cited

FOREIGN PATENT DOCUMENTS

| | | |
|---|---|---|
| JP | 2003-148653 A | 5/2003 |
| WO | WO 99/21144 A1 | 4/1999 |

OTHER PUBLICATIONS

Loaec, A. et al., "Smart Sleeper—Measurement of bending moments in concrete sleepers laid on ballast tracks", Transport Research Arena, 2014, Paris, pp. 1-6.

\* cited by examiner

Fig. 8
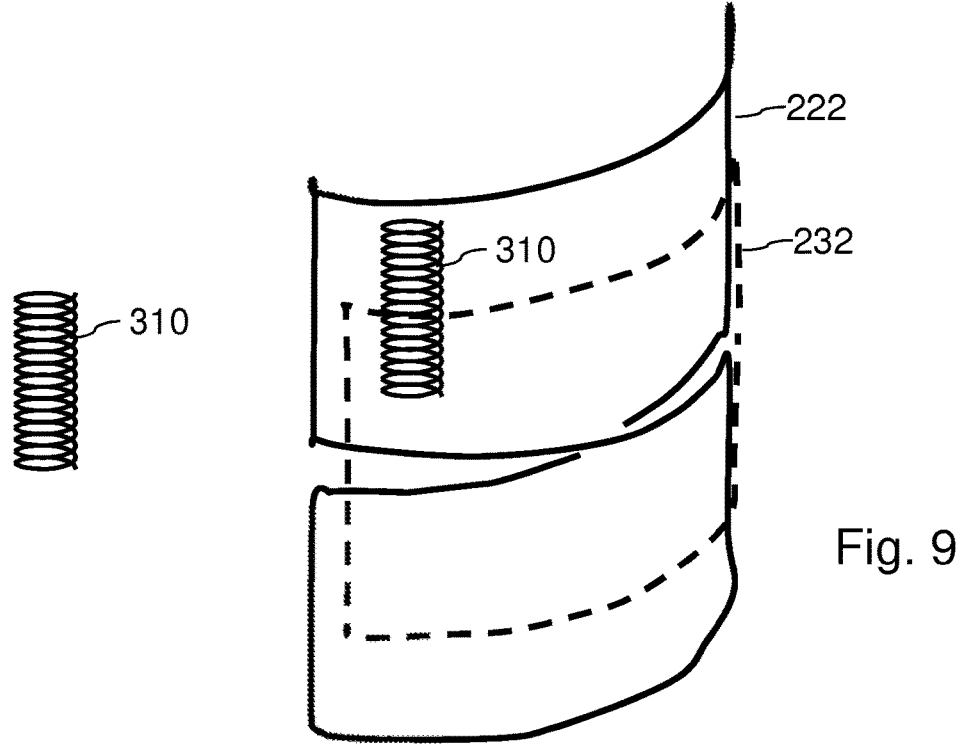
Fig. 9
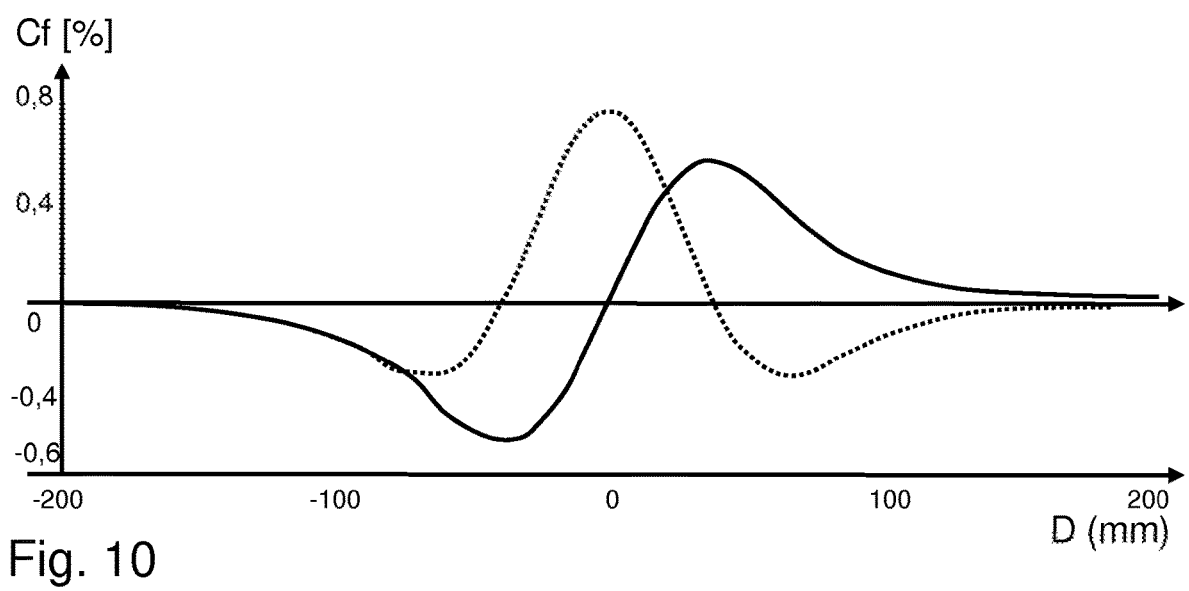
Fig. 10

Fig. 13
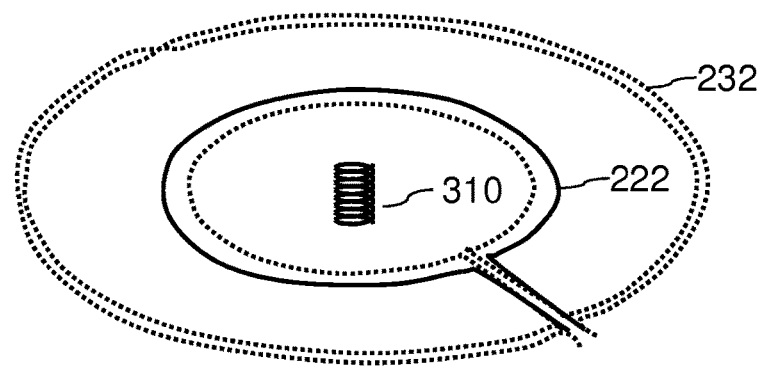
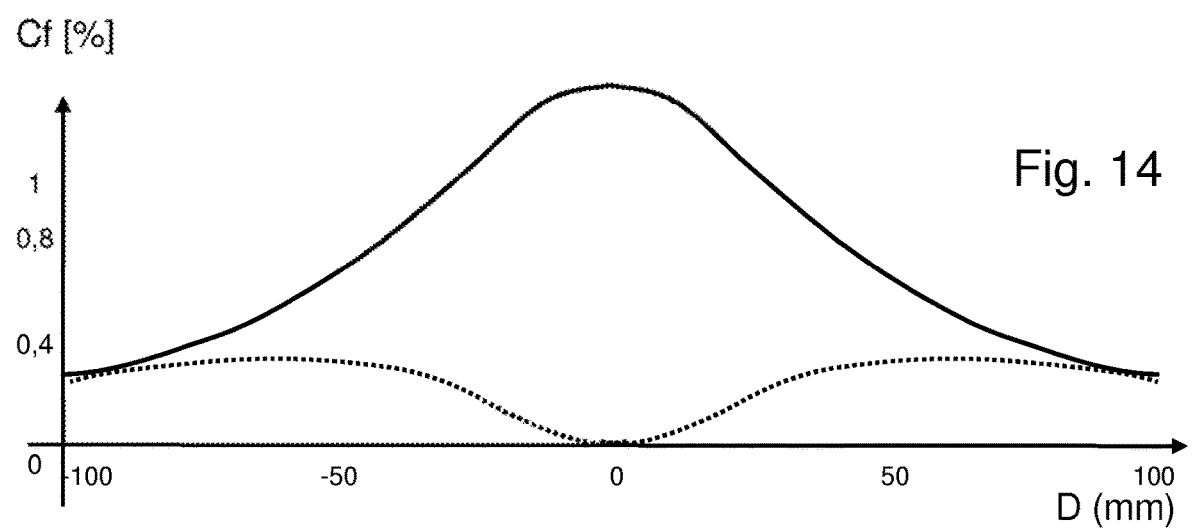
Fig. 14

METHOD AND SYSTEM FOR DETECTING A SPECIFIC RELATIVE POSITION BETWEEN TWO OBJECTS

The invention relates to the location of objects by way of tags and radiofrequency antennas, and in particular to the location of the relative position of objects with maximum accuracy.

Document FR2891980 describes a method for locating an RFID reader communicating with an RFID tag. This method makes it possible to locate the RFID reader by resorting to triangulation by way of a plurality of base stations. By calculating the distance between the RFID reader and the various base stations, an approximate location of the RFID reader is obtained.

The location of the RFID reader is only approximate. Therefore, deducing the location of an RFID tag positioned nearby on the basis of this is even more approximate. Such location furthermore proves to be complex to implement.

Document US20080278289 describes an RFID tag location device using magnetic field-generating beacons. The RFID tag measures the strength of the magnetic fields produced by these beacons, which are positioned at known locations. The position of the tag is estimated by way of triangulation between the magnetic fields measured for various beacons, by way of calculation means internal to the tag, or else at an RFID reader.

The location of the tag is relatively approximate. Locating it also requires a mesh containing a large number of beacons and measuring an electromagnetic field over a frequency band different from the band for communication with the reader.

The invention aims to solve one or more of these drawbacks. The invention thus relates to a system for detecting a specific relative position between a radiofrequency reader and a radiofrequency receiver, as defined in claim 1.

The invention also relates to the variants defined in the dependent claims. A person skilled in the art will understand that each of the features of the variants of the dependent claims may be independently combined with the features of the independent claim, without, however, constituting an intermediate generalization.

The invention furthermore relates to a method for detecting a specific relative position between a radiofrequency reader and a radiofrequency tag, as defined in the appended claims.

Other features and advantages of the invention will become clearly apparent from the description thereof that is given hereinafter, by way of indication and without any limitation, with reference to the appended drawings, in which.

Figure 1:
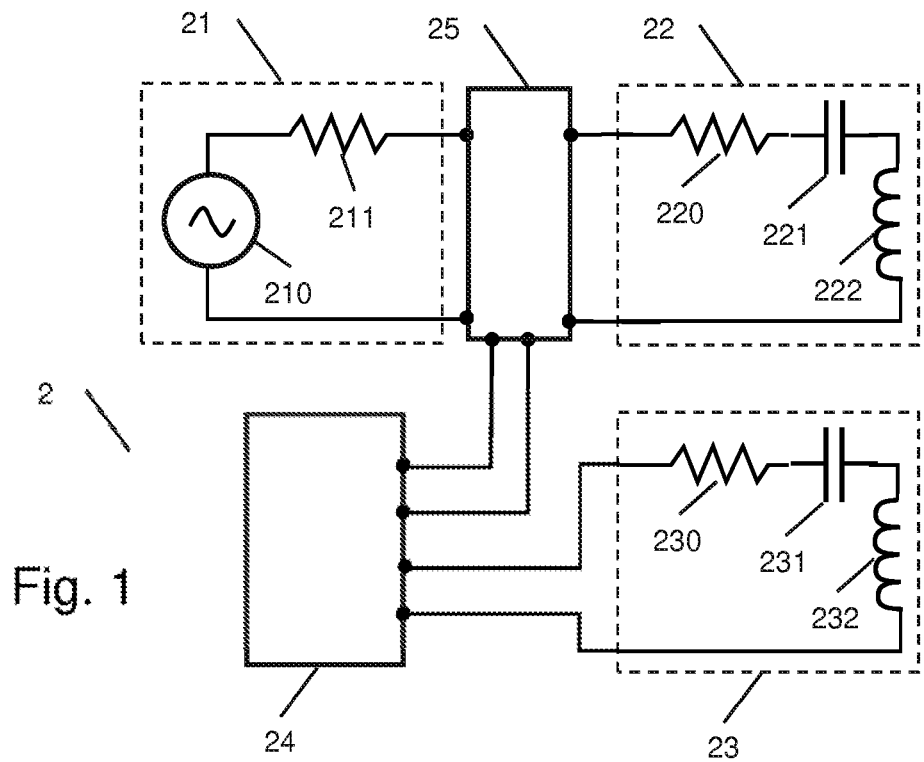
FIG. 1 illustrates a first schematic example of a radiofrequency reader circuit.
Figure 3:
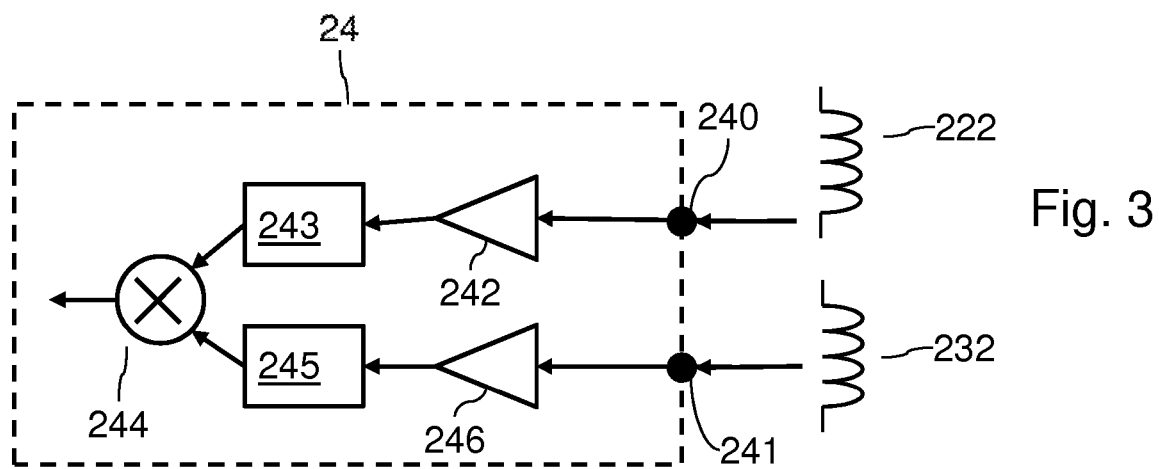
Figure 4:
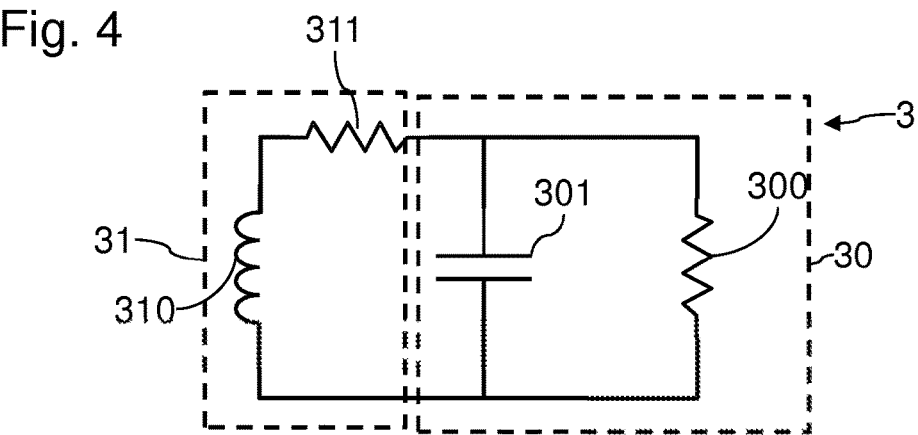
Figure 5:
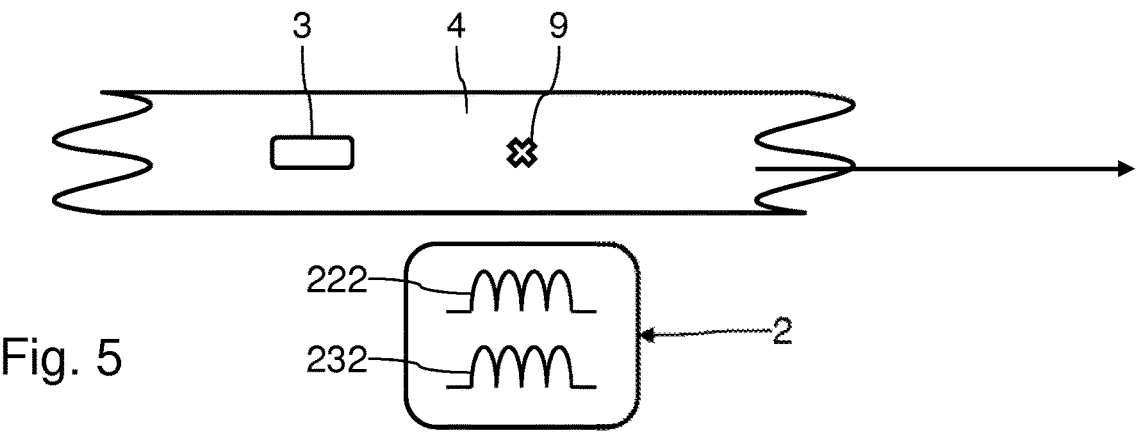
Figure 6:
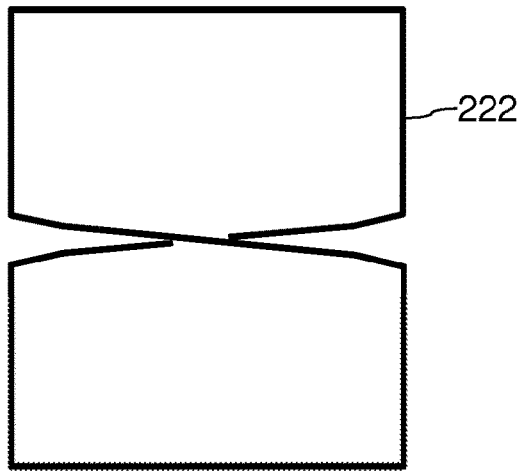
Figure 7:
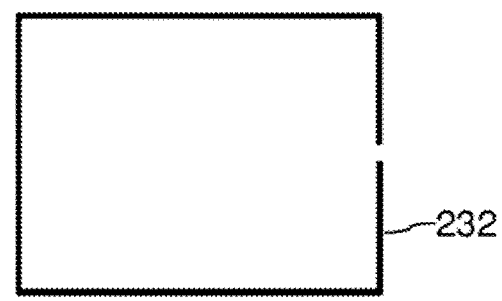
Figure 11:
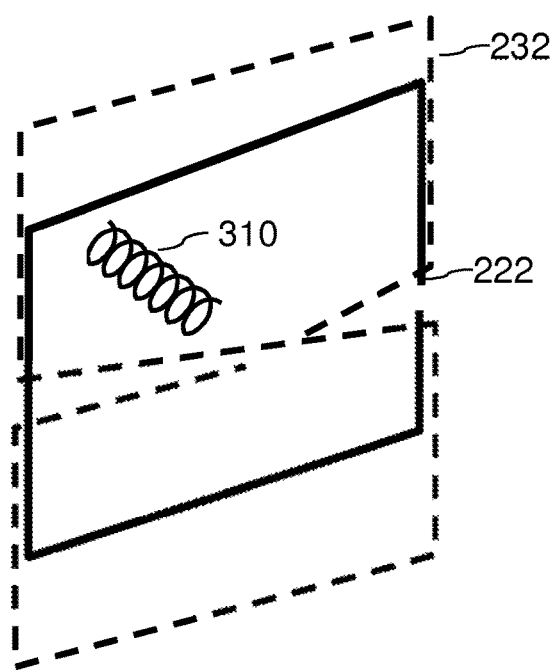
Figure 12:
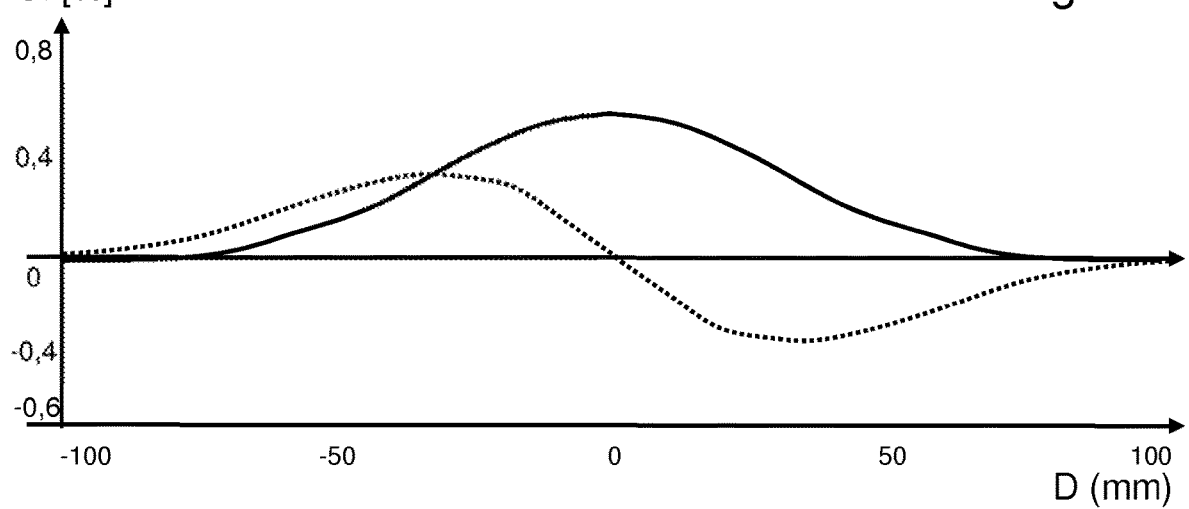
Figure 15:
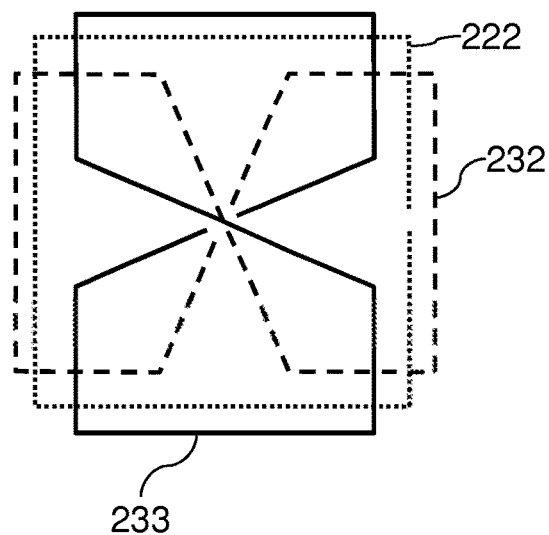
Figure 16:
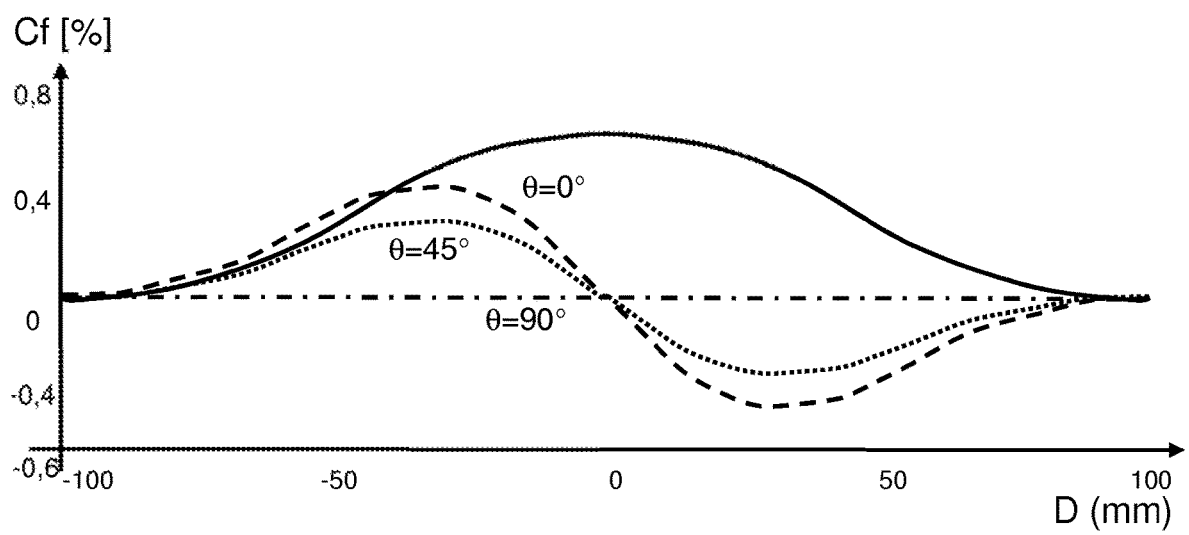

FIG. 3 schematically illustrates a processing circuit of the radiofrequency reader of FIG. 1;

FIG. 4 is a first schematic example of a radiofrequency tag;

FIG. 5 is a perspective view of one example of an implementation of a detection system according to the invention for determining the position of a rope;

FIG. 6 is a plan view of one example of a transceiver antenna circuit of the reader;

FIG. 7 is a plan view of one example of a receiver antenna circuit of the reader;

FIG. 8 is a perspective view of one example of a winding of a receiver antenna of the tag;

FIG. 9 is a perspective view of the antenna circuits and of the antenna winding for a specific relative position;

FIG. 10 is a graph illustrating the inductive coupling of the antennas of the reader with respect to the antenna of the tag, as a function of their relative positions;

FIG. 11 is a perspective view of antenna circuits and of an antenna winding in one variant;

FIG. 12 is a graph illustrating the inductive coupling of the antennas of the reader with respect to the antenna of the tag in the variant of FIG. 11, as a function of their relative positions;

FIG. 13 is a perspective view of antenna circuits and of an antenna winding in one variant;

FIG. 14 is a graph illustrating the inductive coupling of the antennas of the reader with respect to the antenna of the tag in the variant of FIG. 13, as a function of their relative positions;

FIG. 15 is a view in projection of antenna circuits in one variant;

FIG. 16 illustrates graphs of the inductive coupling of the antennas of the reader with respect to the antenna of the tag, as a function of an angle of incidence.

The invention relates to a system for detecting a relative position between two objects, based on an inductive wireless radiofrequency communication device. One example of a detection system 1 is illustrated schematically in FIG. 4, and described in more detail below. The communication device of such a detection system 1 comprises a base station or radiofrequency reader 2, and a stand-alone receiver 3 that is generally denoted using the term tag or contactless card, operating as a receiver and supplied with power remotely. In such a radiofrequency communication device, a link is established by way of a radiofrequency magnetic field between the reader 2 and the receiver 3. This magnetic field is virtually steady-state. The coupling units of the reader 2 and of the receiver 3 include loops, windings or coils that for respective antenna circuits, provided for inductive coupling. Electronic components are associated with each antenna circuit, and their function is to perform frequency tuning, damping or impedance matching. The combination of the antenna circuit and of the electronic components is usually denoted using the term antenna.

Figure 2:
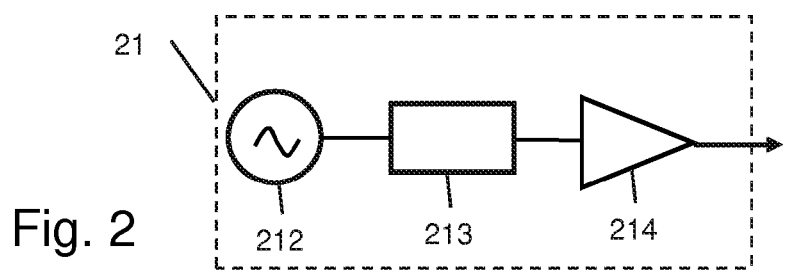
FIG. 2 is a more detailed example of one example of a high-frequency power supply circuit.

FIG. 1 schematically illustrates one example of a radiofrequency reader 2 for a detection system 1 according to the invention. The reader 2 includes a high-frequency signal power supply circuit 21, a transceiver antenna 22, a receiver antenna 23, a processing circuit 24 and a coupler 25 (in this example). The power supply circuit 21 is modeled by a generator 210 connected in series with a resistor 211. More precisely, the power supply circuit 21 may be formed by a signal source 212, by a modulator 213, followed by a power amplifier 214 (including the resistor 211), as illustrated in FIG. 2. The transceiver antenna 22 is modeled by an RLC resonant circuit connected to the power supply circuit 21 by way of the coupler 25. The receiver antenna 23 is deled by an RLC resonant circuit connected to the processing circuit 24. The input signal of the processing circuit 24 for the antenna 22 is supplied by the coupler 2. The coupler 25 may be for example a simple branch connection, a directional coupler, or a current probe. One example of a processing circuit 24 will be described in more detail with reference to FIG. 3.

The transceiver antenna 22 may be modeled by a resistor 220, a capacitor 221 and an inductor 222 that are connected in series. The inductor 222 models the windings or turns of an antenna circuit. The antenna circuit of the receiver antenna 22 will therefore be denoted using this same reference 222 hereinafter. The power supply circuit 21 is configured in a manner known per se so as to supply power to the transceiver antenna 22 so as intentionally to produce a radiofrequency electromagnetic field. To this end, the reader 2 comprises a communication circuit including a radiofrequency emission chain, in a manner known per se.

The processing circuit 24 is connected to the terminals of the antennas 22 and 23 in order to process the electrical signals at the terminals of these antennas 22 and 23. According to one variant, a port 240 of the processing circuit 24 is connected to the coupler 25. A port 241 of the processing circuit 24 is connected to the antenna 23. One or two radiofrequency reception chains of the communication circuit are included in this processing circuit 24, for example.

The receiver antenna 23 may be modeled by a resistor 230, a capacitor 231 and an inductor 232 that are connected in series. The inductor 232 models the windings or turns of an antenna circuit. The antenna circuit of the receiver antenna 23 will therefore be denoted using this same reference 232 hereinafter. The communication circuit comprises a radiofrequency reception chain, not described, connected to the receiver antenna 23.

FIG. 4 schematically illustrates one example of a radiofrequency tag receiver 3 for a detection system 1 according to the invention. The receiver 3 is usually modeled by a parallel RLC circuit, as illustrated in FIG. 3. The receiver 3 is modeled by an antenna 31 connected to a chip 30, The antenna 31 is modeled by an inductor 310 connected in series with a resistor 311. The inductor 310 models the windings or turns of an antenna circuit. The antenna circuit of the antenna 31 will be denoted using this same reference 310 hereinafter. The chip 30 is modeled here by a capacitor 301 and a resistor 300 that are connected in parallel. The resistor 300 generally models the internal circuits of the chip 30, the capacitor 301 modeling a frequency-tuning capacitor. The resonant frequency of the circuit formed by the receiver 3 is generally very close to the operating frequency. A chip such as the one marketed by NXP under the reference SL2S2002FTB: ICODE SLIX may be used, for example.

The inductive coupling between the reader 2 and the receiver 3 makes it possible to transfer energy from the reader 2 to the receiver 3 through mutual inductance. The magnetic field produced at emission by the antenna circuit 222 of the reader 2 at the antenna circuit 310 of the receiver 3 positioned nearby induces an electromotive force fern within this antenna circuit 310:
fem=µ0*H*S*ω. The voltage Ve across the terminals of the chip 30 is greater than this value fern, the voltage gain (overvoltage coefficient) being practically equal to the quality factor of the resonator (quality factor Q≈(Le*ω/R+re/(Le*ω))$^{-1}$, where Le is the value of the inductor 310, R is the value of the resistor 300, re is the value of the resistor 311, where Le*Ce*ωe$^2$=1, Ce is the value of the capacitor 301 and ωe is the angular resonant frequency of the receiver 3) when the resonance tuning corresponds to the operating frequency f0 (ω=ω0, ω0=2π*f0) The voltage Ve is rectified and is generally used to supply power to the electrical and electronic circuits of the receiver 3.

On the other hand, to communicate with the reader 2, the receiver 3 resorts to the load modulation technique by modifying one of its electrical parameters, Le, Ce or R. In the most commonly used solution, a receiver 3 modulates the value R. The load modulation brings about modulation of the current state in the antenna circuit 310 when said circuit is subjected to the primary electromagnetic field produced by the reader 2. This current in the antenna circuit 310 corresponds to the secondary electromagnetic field produced in response by the receiver 3.

The reader 2 thus includes a transceiver antenna circuit 222 and a receiver antenna circuit 232. The antenna circuits 222 and 232 are fixed with respect to one another, for example by being fixed to one and the same support. The antenna circuits 222 and 232 advantageously have a geometric configuration for mutual inductance that is as low as possible; preferably substantially zero. Thus, the signal induced by the electromagnetic field produced by the antenna circuit 222 in the antenna circuit 232 disrupts the processing circuit 24 as little as possible.

The concept of conductive circuits with zero mutual inductance is known and used for various applications. The described geometries with zero mutual inductance are defined on a case-by-case basis. One known method for designing circuits with zero mutual inductance is based on the use of partial mutual inductances. This method advantageously makes it possible to separate various parts of the two conductive circuits into the form of sections and to establish partial mutual inductance between two sections. It is thus possible to define basic rules in order to obtain mutual inductance at the desired value (for example the value of zero).

This method utilizes Neumann's formula, which gives the mutual inductance M12 between two circuits C1 and C2:

$$M_{12} = \frac{\mu_0}{4\pi} \cdot \int_{C_1}\int_{C_2} \frac{d\vec{\ell}_1 \cdot d\vec{\ell}_2}{d}$$

This formula resorts to a double curvilinear integral, which may be broken down into partial mutual inductances by breaking the two circuits C1 and C2 down into sections. The two circuits are provided with a path direction, and these directions are adopted by convention. These path directions involve a sign for the mutual inductance, and for the partial mutual inductances resulting from the breaking down of the circuits C1 and C2.

This formula also makes it possible to derive basic rules applicable to two rectilinear sections. The term under the double integral demonstrates that, if the sections are perpendicular, their mutual inductance is zero, and if the sections are parallel, their mutual inductance is inversely proportional to the distance between the two sections. The mutual inductance is positive if the direction in the two sections is the same, and negative if the directions are opposing.

The invention aims to accurately detect a specific relative position between the reader 2 and the receiver 3. To this end, it is provided that, for this specific relative position:
  the transceiver antenna circuit 222 has nonzero mutual inductance with the antenna circuit 310. Thus, in this specific relative position, the reader 2 is able both to supply power to the receiver 3 and to identify a proximity to the reader 3 on account of the load modulation to the antenna circuit 310, able to be detected by the processing circuit 24 from the signal supplied on its input port 240 and coming from the antenna circuit 222;
  the mutual inductance between the antenna circuit 310 and the receiver antenna circuit 232 exhibits a minimum. It is thus possible to differentiate this specific relative position with respect to other relative positions at which the mutual inductance between the antenna circuit 310 and the antenna circuit 232 is greater. Advantageously, this minimum is a zero value, corresponding to a zero crossing with a change of sign of the mutual inductance.

The processing circuit 24 is thus configured so as to differentiate the following configurations, on the basis of the mutual inductances achieved for the antenna circuits 222 and 232 with the antenna circuit 310:

the reader 2 identifies a lack of proximity of the antenna circuit 310. Regardless of the mutual inductance between the receiver antenna circuit 232 and the antenna circuit 310, the reader 2 identifies that the receiver 3 is not nearby and is not in said specific relative position;

the reader 2 identifies a proximity of the antenna circuit 310, and the lack of a minimum of the mutual inductance between the antenna circuit 232 and the antenna circuit 310. The reader 2 then identifies that the receiver 3 is nearby, but is not in said specific relative position;

the reader 2 identifies a proximity of the antenna circuit 310, and a minimum of the mutual inductance between the antenna circuit 232 and the antenna circuit 310. The reader 2 then identifies that the receiver 3 is nearby and is in said specific relative position. This specific relative position may be determined accurately, the minimum of the mutual inductance between the antenna circuit 232 and the antenna circuit 310 being obtained only for this specific relative position.

FIG. 6 is a front-on view of one example of an antenna circuit 222 of the radiofrequency reader 2, The antenna circuit 222 comprises a wired conductive track (illustrated here projecting into a plane). The conductive track (here made of copper) is arranged on a cylindrical wall having a circular cross section in practice. For the simulations that were performed, the antenna circuit 222 that was chosen has a length of 100 mm, a width of 100 mm, a cylinder radius of 51 mm and a wire diameter of 1 mm. The antenna circuit 222 has an inductance of 513 nH in this case. The wired conductive track of the antenna circuit 222 overall includes two rectangular loops that are connected in series and in opposing directions, so as substantially to be in the shape of an 8. For the simulations that were performed, the antenna 22 was configured so as to communicate at a frequency of 13.56 MHz.

FIG. 7 is a front-on view of one example of an antenna circuit 232 of the radiofrequency reader 2. The antenna circuit 232 comprises a wired conductive track (illustrated here projecting into a plane). The wire (here made of copper) of the antenna circuit 232 in this case follows the contour of a rectangle in projection overall. The conductive track is arranged on a cylindrical wall having a circular cross section in practice. For the simulations that were performed, the antenna circuit 232 that was chosen has a length of 90 mm, a width of 60 mm, a cylinder radius of 52 mm and a wire diameter of 1 mm. The antenna circuit 232 has an inductance of 258 nH in this case.

FIG. 8 is a perspective view of one example of an antenna circuit 310 of the radiofrequency tag 3. The antenna circuit 310 has a conductive wire (made of copper) wound in a spiral. For the simulations that were performed, the antenna circuit 310 that was chosen has a spiral diameter of 10 mm, a spiral length of 30 mm, a number of 10 turns (for the purpose of reducing the calculating time, the number of turns was intentionally reduced, but could in reality be adjusted such that the inductance of the antenna circuit 310 allows a resonant frequency close to the operating frequency, for example 13.56 MHz (taking into account the capacitor 301 embedded in the chip 30, plus the stray capacitance of the antenna circuit 310)), and a wire diameter of 0.2 mm. The antenna circuit 222 has an inductance, of 418 nH in this case. Such an antenna circuit 310 is long and has a small cross section, which proves advantageous for example for integration into a rope, as described hereinafter. The simulations demonstrated that a relatively long antenna circuit 310 did not negatively impact the accuracy of the location of the specific relative position.

FIG. 9 is a perspective view of the antenna circuits 222, 232 and 310 for the specific relative position of the reader 2 and of the receiver 3. The cylinders bearing the antenna circuits 222 and 232 have one and the same axis as the spiral of the antenna circuit 310. In this specific relative position, the antenna circuit 310 does have substantially zero mutual inductance with respect to the antenna circuit 232, and nonzero mutual inductance with respect to the antenna circuit 222.

The antenna circuits 222 and 232 are centered with respect to one another and aligned. The antenna circuits 222 and 232 do have virtually zero geometric mutual inductances in this case.

Other configurations of the antenna circuits 222, 232 and 310 may be contemplated, of course.

FIG. 11 is a perspective view of antenna circuits and of an antenna winding in one variant, illustrating another example of a transceiver antenna circuit 222 of the radiofrequency reader 2, and another example of a receiver antenna circuit 232 of the radiofrequency receiver 2. The orientation of the antenna circuit 310 with respect to the antenna circuits 222 and 232 is also different.

The antenna circuit 222 comprises a wired conductive track arranged on a plane. The conductive track may be made of copper. For the simulations that were performed, the antenna circuit 222 that was chosen in this case follows the contour of a rectangle overall. For the simulations that were performed, the antenna circuit 222 that was chosen has a length of 90 mm, a width of 60 mm and a wire diameter of 1 mm. The antenna circuit 222 has an inductance of 267 nH in this case.

The antenna circuit 232 comprises a wired conductive track arranged on a plane. The conductive track may be made of copper and arranged on another face of one and the same support as the antenna circuit 222. For the simulations that were performed, the antenna circuit 232 that was chosen has a length of 100 mm, a width of 100 mm and a wire diameter of 1 mm. The antenna circuit 232 has an inductance of 515 nH in this case. The wired conductive track of the antenna circuit 232 overall includes two rectangular loops that are connected in series and in opposing directions, so as substantially to be in the shape of an 8.

The antenna circuit 310 has the same geometry and the same structure as in the example described with reference to FIG. 8. The antenna circuit 310 thus has a conductive wire wound in a spiral, the axis of which is perpendicular to the plane of the antenna circuits 222 and 232. The axis of this winding passes through the geometric center of the antenna circuits 222 and 232.

FIG. 12 is a graph illustrating the inductive coupling of the antennas of the reader with respect to the antenna of the tag in the variant of FIG. 11, as a function of their relative positions. It is observed that, when the antenna circuit 310 is moved along a straight line parallel to the plane of the structure of antenna circuits 222 and 232, at a distance of 50 mm in the plane of symmetry of this structure and passing in front of the geometric center, for the relative specific position, the mutual inductance between the antenna circuit 222 and the circuit 310 is at a maximum, whereas the mutual inductance between the antenna circuit 232 and the antenna circuit 310 is zero.

FIG. 13 is a perspective view of antenna circuits and of an antenna winding in one variant, illustrating another example of a transceiver antenna circuit 222 of the radiofrequency reader 2, and another example of a receiver antenna circuit 232 of the radiofrequency receiver 2. The orientation of the antenna circuit 310 with respect to the antenna circuits 222 and 232 is also different.

The antenna circuit 222 comprises a wired conductive track arranged on a plane. The conductive track may be made of copper. For the simulations that were performed, the antenna circuit 222 that was chosen in this case follows the contour of an outer circle overall, with two windings, joining the contour of a circle, with two extensions for the connections. This circle has a diameter of 115 mm and a wire diameter of 1 mm. The inductance is 392 nH in this case.

The antenna circuit 232 comprises a wired conductive track arranged on a plane parallel to the antenna circuit 222. The conductive track may be made of copper and arranged on another face of one and the same support as the antenna circuit 222. For the simulations that were performed, the antenna circuit 232 that was chosen in this case follows the contour of an outer circle overall, with two windings, joining the contour of an inner circle, with one winding. For the simulations that were performed, the diameter of the inner circle is 100 mm, the diameter of the outer circle is 200 mm, and the wire diameter is 1.6 mm. The inductance is 2329 nH in this case. The circles of the antenna circuits 232 and 222 are concentric.

FIG. 14 is a graph illustrating the inductive coupling of the antennas of the reader with respect to the antenna of the tag in the variant of FIG. 13, as a function of their relative positions. It is observed that, when the antenna circuit 310 is moved along the axis perpendicular to the plane of the antenna circuits 222 and 232 and passing through their geometric center, for the relative specific position (antenna circuit 310 at a zero distance from said plane), the mutual inductance between the antenna circuit 222 and the antenna circuit 310 is at a maximum, whereas the mutual inductance between the antenna circuit 232 and the antenna circuit 310 is zero.

FIG. 15 is a view in projection of antenna circuits in one variant. In this variant, the reader 2 includes two receiver antenna circuits 232 and 233. These antenna circuits have substantially the geometry of the antenna circuit 232 of FIG. 11. The antenna circuits 222, 232 and 233 are in parallel planes, typically separated by a dielectric layer. The antenna circuits 232 and 233 are pivoted by 90° in the example.

The antenna circuit 310 has the same geometry and the same structure as in the example described with reference to FIG. 8. The antenna circuit 310 thus has a conductive wire wound in a spiral, the axis of which is perpendicular to the plane of the antenna circuits 222, 232 and 233 and passing through their geometric center. In the relative specific position, the antenna circuit 310 has its axis that passes through the geometric center of the antenna circuits 222, 232 and 233. If the antenna circuit 310 is moved into a plane containing the relative specific position, said position will be identified when the antenna circuit 310 reaches it.

FIG. 16 illustrates a graph of the inductive coupling of one of the receiver antenna circuits of the reader with respect to the relative specific position, in the event that the receiver 3 is moved over a rectilinear path in a plane parallel to the plane of the structure of the antenna circuits 222, 232 and 233 and passing through the specific position point. The inductive coupling between one of the receiver antenna circuits is plotted as a function of the angle of incidence θ of the path with respect to the straight line of the plane intersecting the plane of symmetry of the receiver antenna circuit. For the sake of simplicity, just one graph of the inductive coupling of the transceiver antenna circuit is illustrated, this coupling being impacted by the value of the angle θ to a small extent. It is observed that the mutual inductance between the antenna circuit 310 and the antenna circuit 222 remains at a maximum for the relative specific position, regardless of this angle of incidence. It is also observed that the mutual inductance between the antenna circuits 232 and 233 and the antenna circuit 310 is zero for the relative specific position, regardless of this angle of incidence. It is, also observed that, when this angle of incidence θ adopts a value close to 90° and that when the graph of the inductive coupling between the antenna circuit 310 and the receiver antenna circuit on the basis of which the angle of incidence is defined no longer makes it possible to differentiate the relative specific position, the second receiver antenna circuit then allows this differentiation (the angle of incidence defined with respect to this second circuit is θ+π/2).

For the geometry of the antenna circuits 222, 232 and 310 described with reference to FIG. 9, FIG. 10 is a graph illustrating the inductive coupling of the antenna circuits 222 and 232 with the antenna circuit 310 during sliding of the receiver 3 with respect to the reader 2, passing through the relative specific position illustrated in perspective in FIG. 9. The abscissa corresponds to the distance from this relative specific position during the sliding.

The coupling between the antenna circuit 222 and the antenna circuit 310 (illustrated in dotted lines) exhibits three extrema (at the positions −65, 0 and +65 mm) and two minima (at the positions −40 and +40 mm). The communication from the reader 2 to the receiver 3 and the supply of power to the receiver 3 by the reader 2 may potentially be performed at three different locations on this path. The maximum value of the mutual inductance in this case reaches 3.5 nH (Cf=0.76%).

The coupling between the antenna circuit 233 and the antenna circuit 310 (illustrated in an unbroken line) exhibits two extrema (at the positions −40 and +40 mm) and one minimum for a median position between these two extrema (Cf=−0.55% and +0.55%). The inductive coupling between the antenna circuit 233 and the antenna circuit 310 changes from a value of −0.1% to +0.1% over a distance of 10 mm containing the specific relative position. As this area of minimal inductive coupling is particularly short, the specific relative position between the reader 2 and the receiver 3 is able to be identified very accurately.

Generally speaking, the processing circuit 24 is able to make the identification of a minimum of the mutual inductance between the antenna circuit 232 and the antenna circuit 310 conditional upon the following requirement: the mutual inductance between the antenna circuit 232 and the antenna circuit 310 has to exceed a threshold beforehand. It is thus possible to determine that the detected mutual inductance minimum does correspond to the specific relative position.

Among the applications contemplated, it is possible for example to provide a mobile reader 2 and a fixed receiver 3, or a fixed reader 2 and a mobile receiver 3. The one of the two objects that is mobile may for example be guided along a path passing through the specific relative position between the reader 2 and the receiver 3.

In the application illustrated in FIG. 4, the receiver 3 is integrated into a rope 4. The receiver 3 is for example positioned at the neutral fiber of the rope 4. The rope 4 is in this case guided so as to move past the fixed reader 2. Thus, as the rope 4 travels, the receiver 3 will pass through the relative specific position illustrated by the cross 9 (the cross 9 identifies a location fixed with respect to the reader 2). The time at which the receiver 3 passes through the cross will thus be able to be identified extremely accurately.

By positioning the receiver 3 at the neutral fiber of the rope 4, with the geometry of the antenna circuit 310 described with reference to FIG. 7, the mutual inductance between this antenna circuit 310 and the antenna circuit 232 is not changed by a rotation of the rope 4 about its axis. Specifically, its mutual inductance with the antenna circuit 222, the antenna circuit 232, respectively, does not vary on the basis of a rotation about its axis.

According to one possible application, the rope 4 may be provided with a plurality of receivers 3 having known positions along this rope 4 when this rope 4 is produced. The receivers 3 are positioned for example at identical distance increments along this rope 4. If the rope 4 is moved at a predetermined speed, it is possible to measure the time intervals between the detection of two successive receivers 3. It is then possible to deduce therefrom the effective distance (distance on the curvilinear abscissa along the rope 4) between the successive receivers 3. Measuring the distance between the successive receivers 3 makes it possible for example to determine the extension of the rope caused by the ageing thereof or caused by the onset of breakage. It is thus possible to anticipate the need to replace such a rope 4.

The rope 4 is for example a hauling rope having a diameter of around 75 mm, able to be used in the offshore oil industry.

According to another application, it is possible to use the combination of a reader 2 and receiver 3 to detect specific positions of an elevator with respect to an elevator cab. It is possible for example to fix receivers 3 at specific positions of interest (for example area where braking begins, floor stopping position, etc.) and fix a reader 2 to, the elevator. By fixing the reader 2 such that, during the travel of the elevator, this reader 2 passes through these specific relative positions with respect to the various receivers 3, each of these specific relative positions will be able to be detected accurately.

Thus, in these various examples, the relative path of a receiver 3 with respect to a reader 2 is predefined by guidance, such that, during travel along this path, the receiver 3 and the reader 2 are temporarily in their specific relative position, giving rise to detection.

It may also be provided for the relative path between the receiver 3 and the reader 2 not to be predefined. The role of the detection system 1 is then that of identifying when the receiver 3 and the reader 2 have reached their specific relative position, even if the relative path is two-dimensional or three-dimensional and not predefined by relative guidance.

FIG. 3 schematically illustrates one example of a processing circuit 24 intended to boost the accuracy of the determination of the relative specific position.

The processing circuit 24 typically comprises a low-noise amplifier 242 connected to the antenna circuit 222. The low-noise amplifier 242 is connected to a signal processing circuit 243 configured so as to extract the components from the signal from the antenna circuit 222 in relation to the load modulation performed by the receiver 3 for the return communication. For example, in the case of a communication protocol using a subcarrier for the return communication, this return frame signal takes the form of a return subcarrier signal modulated by the baseband signal after modulations of the carrier (the center frequency of the electromagnetic field generated by the antenna circuit 222, typically 13.56 MHz). The use of a subcarrier for the return communication is preferable, for the purpose of achieving reliable and fast detection of the specific relative position.

The processing circuit 24 typically comprises a low-noise amplifier 246 connected to the antenna circuit 232. The low-noise amplifier 246 is connected to a signal processing circuit 245 configured so as to extract the components from the signal from the antenna circuit 232 in relation to the load modulation performed by the receiver 3 during the return communication thereof. The determination of an inductive coupling minimum of the antenna circuit 232 with the antenna circuit 310 of the receiver 3 is reflected in a minimum of the signal components in relation to the load modulation.

By cross-referencing the information supplied by the signal processing circuits 243 and 245, the processing circuit 24 is able to identify the specific relative position using the logic described above.

Advantageously, the processing circuit 24 includes a circuit 244 for calculating the correlation between the return signal to the antenna circuit 222 and the signal to the antenna circuit 232 so as to increase the measurement accuracy of the subcarrier component, in particular by adding a concept of phase.

The binary information frame transmitted by the receiver 3 to the reader 2 is constructed by second-level modulation on this subcarrier (for example using ASK for amplitude shift keying or BPSK for binary phase shift keying) by way of frame delimiters (SOF for start of frame and EOF for end of frame). This subcarrier signal makes it possible to distinguish, at the reader 2, the (low-level) part of the spectrum of the return communication radiofrequency signal coming from the receiver 3 from the power signal produced by the reader 2 at the carrier frequency at emission.

Advantageously, the reader 2 and the receiver 3 have identification functions, the receiver 3 being able to communicate a unique identification number, for example using RFID identification technology. If a plurality of receivers 3 are liable to pass through a specific relative position in relation to the reader 2, these receivers 3 are thus able to be differentiated.

The reader 2 and the receiver 3 may comply for example with the standards ISO14443, ISO18000-3 or ISO15693 for a communication frequency at 13.56 MHz, or ISO18000-2 for a communication frequency at a level lower than 135 kHz. An RF communication frequency (between 3 and 30 MHz) will be preferred so as to improve detection speed while at the same time remaining within the domain of coupled inductive circuits. The load modulation by the receiver is performed at an intermediate rate, called subcarrier frequency (a submultiple of the carrier frequency of 13.56 MHz).

The communication between the antenna 22 and the tag 3 may be performed using protocols known per se to those skilled in the art.

In a manner known per se, the information in a memory of an RFID receiver 3 may be updated by the reader 2. Advantageously, the receiver 3 has a memory to which the reader 2 is able to write or in which said reader is able to change information immediately after the detection of the specific relative position.

A communication protocol having a faster or slower bit rate will be selected depending on the relative speeds of movement between a reader 2 and a receiver 3. For example, the protocol ISO15693 provides a command called "Inventory" that is able to be set at a frequency of 130 Hz. This makes it possible to perform sampling for detection of the specific relative position with a resolution of at least 0.76 cm, in the case of a receiver 3 moving at 1 m/s. The total time between the start of an "Inventory" command and the end, of the response is around 5.8 ms. In order to make it possible to reduce the spatial sampling to around 5 mm for a speed of movement of 1 m/s, the protocol ISO14443 will be optimally adjusted.

In the examples illustrated above, the reader 2 includes a single receiver antenna circuit 232. It is also possible to contemplate providing the reader 2 with a plurality of receiver antenna circuits having various orientations, so as to be able to detect various specific relative positions with respect to a receiver 3.

The invention claimed is:

1. A system for detecting a specific relative position between a radiofrequency reader and a radiofrequency receiver, comprising:
    an inductive contactless radiofrequency receiver comprising an antenna winding and a circuit configured to selectively modulate electrical load at terminals of the antenna winding;
    an inductive contactless radiofrequency reader comprising:
        a transceiver antenna circuit having nonzero mutual inductance with the antenna winding of the radiofrequency receiver for the specific relative position;
        a communication circuit, comprising a radiofrequency emission chain and a radiofrequency reception chain that are connected to the transceiver antenna circuit;
        a receiver antenna circuit having mutual inductance with the antenna winding of the radiofrequency receiver that exhibits a minimum for the specific relative position;
        a processing circuit connected to the transceiver antenna circuit and configured to:
            identify presence of a receiver by detecting nonzero mutual inductance between the transceiver antenna circuit and an antenna winding;
            detect a mutual inductance minimum between the receiver antenna circuit and an antenna winding;
            determine that the reader and a radiofrequency receiver are in the specific relative position during identification of the presence of a receiver at the same time as the detection of a mutual inductance minimum between the receiver antenna circuit and an antenna winding.

2. The detection system as claimed in claim 1, wherein the transceiver antenna circuit has nonzero mutual inductance with the antenna winding when the reader and the receiver are at a distance of less than 20 mm from the specific relative position.

3. The detection system as claimed in claim 1, wherein the processing circuit is configured to determine that the reader and the radiofrequency receiver are in the specific relative position only after having identified beforehand detection of mutual inductance between the receiver antenna circuit and an antenna winding that is greater than a threshold.

4. The detection system as claimed in claim 1, wherein the inductive coupling factor between the receiver antenna circuit and the transceiver antenna circuit is less than 1%.

5. The detection system as claimed in claim 1, wherein the receiver is an RFID tag.

6. The detection system as claimed in claim 1, wherein the radiofrequency emission chain is configured to communicate, by the transceiver antenna circuit, at a first frequency, the circuit of the receiver being configured to selectively modulate the electrical load at the terminals of the antenna winding at a frequency different from the first frequency.

7. The detection system as claimed in claim 6, wherein the circuit of the receiver is configured to selectively modulate the electrical load at the terminals of the antenna winding at a subcarrier of the first frequency.

8. The detection system as claimed in claim 1, wherein the transceiver circuit has a length at least twice as long as a length of the antenna winding.

9. The detection system as claimed in claim 1, wherein the processing circuit is configured to calculate a correlation between a signal received on the transceiver antenna circuit and a signal received on the receiver antenna circuit.

10. The detection system as claimed in claim 1, further comprising a device for guiding relative movement between the radiofrequency reader and the radiofrequency receiver along a predefined path, the predefined path passing through the specific relative position.

11. The detection system as claimed in claim 10, further comprising an elongated component guided along the path predefined with respect to the radiofrequency reader, the elongated component including a plurality of the radiofrequency receivers fixed at various locations along the elongated component.

12. A method for detecting a specific relative position between a radiofrequency reader and a radiofrequency tag, with:
    the radiofrequency receiver being of inductive contactless type and comprising an antenna winding;
    the reader being an inductive contactless radiofrequency reader, comprising:
        a transceiver antenna circuit having nonzero mutual inductance with the antenna winding of the radiofrequency receiver for the specific relative position;
        a receiver antenna circuit having mutual inductance with the antenna winding of the radiofrequency receiver that exhibits a minimum for the specific relative position;
    the method comprising:
        emitting a radiofrequency signal by the transceiver antenna circuit of the radiofrequency reader;
        modulating an electrical load at terminals of the antenna winding of the receiver in response to the emission of the radiofrequency signal;
        identifying presence of the receiver by detecting nonzero mutual inductance between the transceiver antenna circuit and the antenna winding;
        determining that the reader and the radiofrequency receiver are in the specific relative position during the identification of the presence of the receiver at the same time as detection of a mutual inductance minimum between the receiver antenna circuit and the antenna winding.

* * * * *